Figure 1:
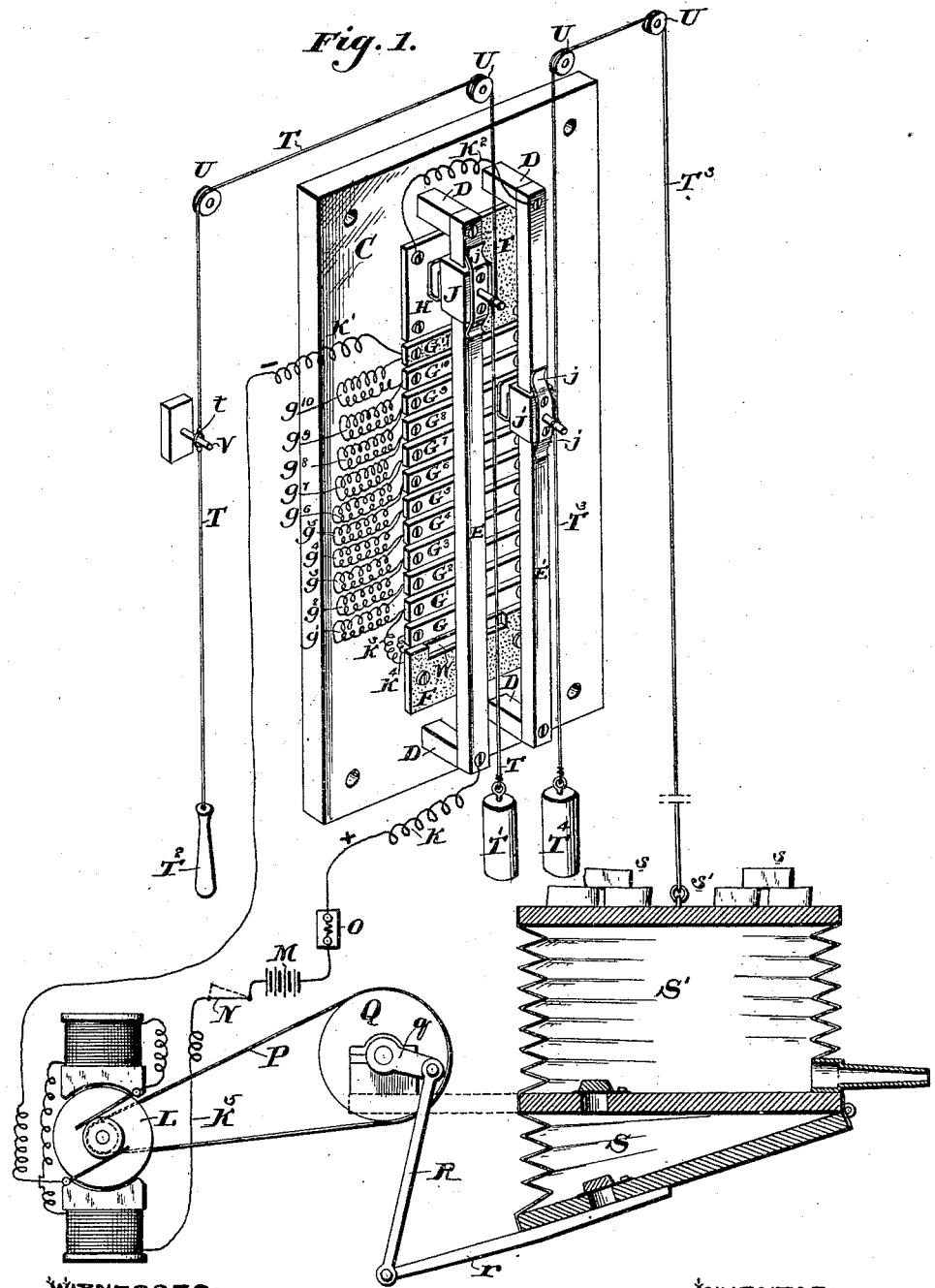

(No Model.) 2 Sheets—Sheet 1.

D. PEPPER, Jr.
MOTOR REGULATOR.

No. 441,807. Patented Dec. 2, 1890.

WITNESSES:

INVENTOR:

(No Model.) 2 Sheets—Sheet 2.

D. PEPPER, Jr.
MOTOR REGULATOR.

No. 441,807. Patented Dec. 2, 1890.

WITNESSES:
David S. Williams
Joshua Matlack, Jr.

INVENTOR:
David Pepper Jr
by his atty
Francis T. Chambers

THE NORRIS PETERS CO., PHOTO-LITHO., WASHINGTON, D. C.

United States Patent Office.

DAVID PEPPER, JR., OF PHILADELPHIA, PENNSYLVANIA, ASSIGNOR TO HIMSELF AND HARRY G. CLAY, JR., OF SAME PLACE.

MOTOR-REGULATOR.

SPECIFICATION forming part of Letters Patent No. 441,807, dated December 2, 1890.

Application filed October 1, 1890. Serial No. 366,771. (No model.)

*To all whom it may concern:*

Be it known that I, DAVID PEPPER, Jr., of the city and county of Philadelphia, State of Pennsylvania, have invented a certain new and useful Improved Rheostat, of which the following is a true and exact description, reference being had to the accompanying drawings, which form a part of this specification.

My invention relates to the construction of rheostats, and especially to such as are used with circuits connecting with electric motors and by which the current passing to the motor is regulated in accordance with the work to be performed.

The object of my invention is to provide a device by which the current when first established through the circuit will meet with high but gradually decreasing resistance, and by which, after the motor is started, the resistance of the current will be automatically maintained in proper proportion to the work required of the motor.

Generally speaking, my invention consists of a resistance-box connected at one end with the circuit, a switch arranged by a progressive movement to complete the circuit through the resistance-box, gradually cut out resistance, and finally cut the resistance-box again out of the circuit, a second switch arranged to connect with the source of supply at the time the first switch completes its movement and severs connection with the resistance-box, and automatic means for moving said second switch over the contact-plates of a resistance-box connected through it with the circuit.

In the drawings I have illustrated my device in what I believe to be its best and most economical form, and in said drawings—

Figure 2:
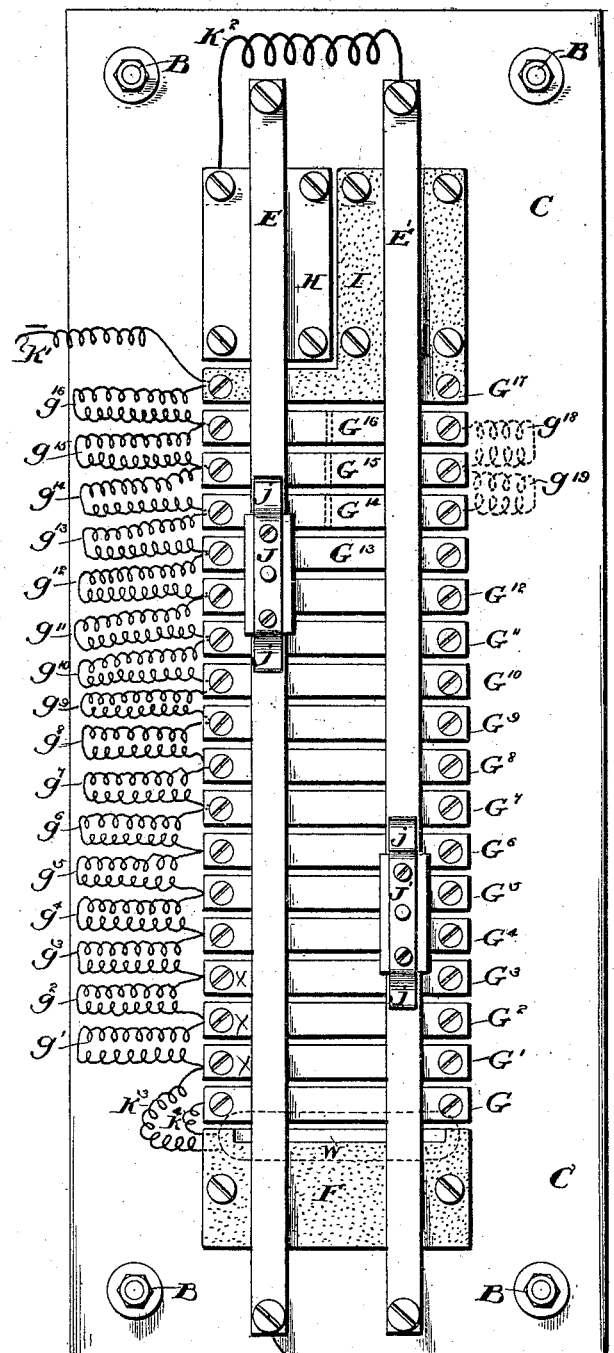

Figure 1 is a perspective view of my improved rheostat in combination with a motor and bellows actuated by said motor, and an air-reservoir, the device as here shown being adapted for application to church-organs. Fig. 2 is a plan view of the rheostat, and Fig. 3 a side elevation thereof.

A is a plate, to which, as shown, the rheostat is attached.

C is a non-conducting plate, which may conveniently be of slate, and which is secured to the foundation-plate A by blocks and screws, as shown at B B, &c.

E and E' are bars lying parallel above the surface of the plate C and screwed to it, as shown by connections D D, &c. The bars E and E' in the construction illustrated are made of conducting material.

F is a plate, preferably of non-conducting material, upon which the spring of the sliding switch, hereinafter described, rests when the rheostat is thrown out of connection with the circuit. I may state that this plate is not necessary, as the spring of the sliding switch may after leaving the conducting-plates remain out of contact with anything until again moved back.

Figure 3:
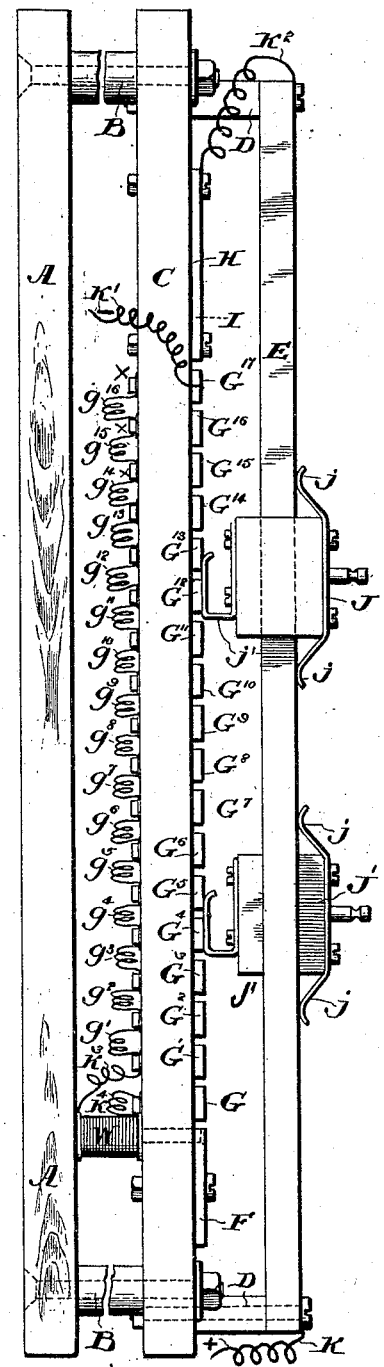

G G' $G^2$ $G^3$, &c., are conducting-plates secured parallel to each other upon the plate C. Beginning with the plate G' these conducting-plates are connected together in series by means of conductors offering a high resistance to the passage of the current. As shown, resistance-coils $g'$ $g^2$ $g^3$, &c., are used. These coils will most conveniently be connected with the plates through bolts X X, &c., which secure the plates to the plate C, the resistance-coils lying between the plates C and A, as shown in Fig. 3. For convenience in illustration, however, I have in Figs. 1 and 2 represented the resistance-coils as connecting directly with the plates above the plate C.

At the end of the series of plates G' $G^2$, &c., a conductor K' leads to the motor H is a plate of conducting material secured to the plate C in advance of the end plate $G^{17}$ of the series. This plate is connected with the bar E' by a conductor $K^2$, and the bar E is connected with the source of electrical supply by a conductor K.

I is, as shown, a continuation of the plate $G^{17}$, extending beneath the bar E' and parallel to the plate H, but not electrically connected with it.

J and J' are slides or switches, made of a conducting material, in whole or in part, and adapted to move to and fro upon the bars E and E'. These slides are provided with spring extensions $j'$, which as they move to and fro on the bars come in contact with and establish electrical connection with the plates G G', &c.

*j j* are springs arranged, as shown, to keep the slides in close contact with the conducting-bars on which they move.

W is a magnet arranged to blow out the arc formed when the switch J in its downward movement cuts off connections with the resistance-box. As shown, the coil of the magnet is connected at one end by means of a conductor $K^3$ with the terminal plate G' of the series. The other extremity of the coil is connected with the conducting-plate G, so that as the spring $j'$ moves from the plate G' to the plate G the arc will be blown out by the current passing through the magnet.

M is the source of electrical supply connecting through conductor K with the guide-bar E and through conductor $K^5$ with the coils of an electro-motor.

O indicates a cut-out, and N a switch in the conductor K. The electro-motor L is also connected with the conductor K', leading from the terminal plate of the resistance-box.

P is a belt connecting the motor with a pulley Q, on the shaft of which a crank $q$ is secured and connected with a rod R, which in turn is connected by means of lever $r$ with a bellows S, which as the crank revolves pumps air into a reservoir S'.

*s s* indicate weights placed upon the top of the reservoir S', and $s'$ a ring, to which is connected a cord $T^3$, which, passing over pulleys, as U U, connects with the switch-slide J', and has depending from its end a weight $T^4$. The result of this connection is that as the reservoir S' is filled with air the weight $T^4$, acting on cord $T^3$, will draw the switch-slide J' down while the collapse of the reservoir has the opposite effect, drawing the switch-slide J' upward. The switch-slide J is similarly connected with a cord T, passing over pulleys, as U, having at one end a weight T' and at the other end a handle $T^2$.

The operation of the weight, which is here not counterbalanced, is to draw the switch-slide J down, while its upward movement is accomplished by means of the handle $T^2$ and the cord T. It is held in its uppermost position, as shown in Fig. 1, by engaging the cord by means of a ring $t$ passing over a pin V.

The operation of the device is as follows: The switch-slide J' is or may be always in contact with the plates G' $G^2$, &c., of the resistance-box, its position on said plates being automatically regulated as by means of the weight and pulley illustrated in Fig. 1. The normal position of the slide J is over the plate F and out of contact with the resistance-box, which is thus cut out from the circuit. When it is desired to start the motor, the switch-slide J is moved upward, as by pulling on cord T, thus first establishing connection through the plate G' and through the series of plates and resistance-coils to the conductor K', and the motor moving up over the plates $G^2 G^3$, &c., the amount of resistance is steadily diminished until when the switch-slide reaches the plate $G^{17}$ a current is established in full force. The slide J', then continuing its movement, comes in contact with the conducting-plate H and leaves its contact with the plates of the resistance-box, which is thus cut out of connection through the switch J; but the current passing through the switch J is conveyed through the plate H and the conductor $K^2$ to the guide-bar E', and from said guide-bar to the switch-slide J' and thence to the plates of the resistance-box, the plate through which the connection is made and the degree of resistance met with depending, of course, upon the position of the slide J', which position is automatically regulated in the way already described.

The advantage of my device will be readily seen. The starting of the motor is accomplished by a gradually-increasing current, so that undue strains in starting are avoided, while the running speed of the motor is automatically governed by the movement of the second switch-slide. The resistance-box is cut out, of course, by simply permitting the slide J to move back over the course it follows in starting the machine until it leaves contact with the plates of the resistance-box.

It is preferable, for reasons of economy and compactness of construction, that both of the switch-slides should be arranged, as shown, to move over the same set of contact-plates and the current regulated by the same set of resistance-coils. This is not essential, however, as each switch-slide may move over an independent resistance-box. Thus, for instance, as shown in Fig. 2 in dotted lines, the plates $G^{14}$, $G^{15}$, and $G^{16}$ are divided in the middle, and resistance-coils, as $g^{18}$ $g^{19}$, provided, so as to make an entirely independent resistance-box.

It will of course be understood that the means for effecting the desired connections may be made in any of the many well-known ways, those illustrated being merely given as convenient examples well adapted for my particular device.

Having now described my invention, what I claim as new, and desire to secure by Letters Patent, is—

1. The combination of a resistance-box connected at one end with a circuit, a switch arranged, as specified, to complete the circuit through said box and by progressive movement cut out resistance until at the end thereof the box is cut out, a second switch arranged to connect with the circuit as the first switch severs connection with the resistance-box, and automatic means for moving said second switch over the resistance-box in the circuit, all substantially as and for the purpose specified.

2. In a rheostat, the combination of a series of conducting-plates electrically connected in series by conductors offering high resistance to the passage of the current, and having a conductor leading from one end of the series, a conducting slide or switch adapted to move over the series of plates from and to points beyond the series and having means for connecting it with a source of electrical supply, a second conducting slide or switch adapted to move over the series of plates and having an electrical connection arranged to connect with the supply as and after the first slide leaves contact with the plates at the end of the series having a conductor leading from it, and means for automatically moving the second slide over the plates, all substantially as and for the purpose specified.

DAVID PEPPER, JR.

Witnesses:
LEWIS R. DICK,
JOSHUA MATLACK, Jr.